(12) United States Patent
Kim et al.

(10) Patent No.: US 9,363,771 B2
(45) Date of Patent: *Jun. 7, 2016

(54) METHOD AND APPARATUS FOR CONTROLLING UPLINK POWER IN A WIRELESS ACCESS SYSTEM

(71) Applicant: LG ELECTRONICS INC., Seoul (KR)

(72) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,601

(22) Filed: Jun. 29, 2015

(65) Prior Publication Data

US 2015/0304967 A1    Oct. 22, 2015

Related U.S. Application Data

(63) Continuation of application No. 13/894,258, filed on May 14, 2013, now Pat. No. 9,107,176, which is a continuation of application No. 13/513,085, filed as application No. PCT/KR2011/002286 on Apr. 1, 2011, now Pat. No. 8,462,705.

(Continued)

(51) Int. Cl.
*H04L 1/00*  (2006.01)
*H04W 52/36*  (2009.01)
(Continued)

(52) U.S. Cl.
CPC ............. *H04W 52/365* (2013.01); *H04L 5/001* (2013.01); *H04L 5/0053* (2013.01); *H04W 24/02* (2013.01);

(Continued)

(58) Field of Classification Search
CPC ..... H04W 80/04; H04W 80/05; H04W 80/06; H04W 80/07; H04W 80/08; H04W 72/04; H04W 76/00
USPC ............................................. 370/328, 329, 34
See application file for complete search history.

(56) References Cited

U.S. PATENT DOCUMENTS

2007/0097962 A1    5/2007    Yoon et al.
2010/0091724 A1    4/2010    Ishii et al.
(Continued)

FOREIGN PATENT DOCUMENTS

CN    101637056 A    1/2010
KR    10-2008-0069649 A    7/2008
(Continued)

OTHER PUBLICATIONS

3GPP TS 36.213 V9.1.0; "3rd Generation Partnership Project; Technical Specification Group Radio Access Network; Evolved Universal Terrestrial Radio Access (E-UTRA); Physical layer procedures" (Release 9); 2010-03; pp. 1-79.
(Continued)

*Primary Examiner* — Dady Chery
(74) *Attorney, Agent, or Firm* — Birch, Stewart, Kolasch & Birch, LLP

(57) ABSTRACT

A method for reporting power headroom value in a wireless access system that supports a carrier aggregation, and a user equipment (UE) for performing the method are discussed. The method according to one embodiment includes receiving a uplink transmission grant allocating uplink resources on a predetermined subframe in an anchor uplink component carrier (UL CC); obtaining power headroom value for the anchor UL CC, if the UE is configured with a simultaneous physical uplink control channel (PUCCH) and physical uplink shared channel (PUSCH) transmission; and reporting the power headroom value to a base station. The power headroom value is calculated.

8 Claims, 10 Drawing Sheets

Related U.S. Application Data

(60) Provisional application No. 61/320,285, filed on Apr. 1, 2010, provisional application No. 61/324,728, filed on Apr. 15, 2010.

(51) Int. Cl.

| | |
|---|---|
| *H04L 5/00* | (2006.01) |
| *H04W 52/14* | (2009.01) |
| *H04W 72/12* | (2009.01) |
| *H04W 24/02* | (2009.01) |
| *H04W 72/04* | (2009.01) |
| *H04W 52/30* | (2009.01) |
| *H04W 52/32* | (2009.01) |

(52) U.S. Cl.
CPC ............ *H04W 52/146* (2013.01); *H04W 52/30* (2013.01); *H04W 52/367* (2013.01); *H04W 72/0413* (2013.01); *H04W 72/1231* (2013.01); *H04W 72/1278* (2013.01); *H04W 52/325* (2013.01)

(56) References Cited

U.S. PATENT DOCUMENTS

| | | | |
|---|---|---|---|
| 2010/0093386 A1 | 4/2010 | Damnjanovic et al. | |
| 2010/0296471 A1 | 11/2010 | Heo et al. | |
| 2010/0297993 A1 | 11/2010 | Heo et al. | |
| 2011/0105173 A1 | 5/2011 | Haim et al. | |
| 2011/0134774 A1 | 6/2011 | Pelletier et al. | |
| 2011/0141928 A1 | 6/2011 | Shin et al. | |
| 2011/0158117 A1 | 6/2011 | Ho et al. | |
| 2011/0205966 A1 | 8/2011 | Iwai et al. | |
| 2012/0120906 A1 | 5/2012 | Pan et al. | |
| 2012/0224535 A1 | 9/2012 | Kim et al. | |
| 2012/0294167 A1 | 11/2012 | Zhu et al. | |
| 2013/0301533 A1 | 11/2013 | Oteri et al. | |

FOREIGN PATENT DOCUMENTS

| | | |
|---|---|---|
| KR | 10-2009-0083418 A | 8/2009 |
| KR | 10-2009-0122203 A | 11/2009 |
| WO | WO 2009/153978 A1 | 12/2009 |
| WO | WO 2010/065759 A2 | 6/2010 |

OTHER PUBLICATIONS

3GPP TSG RAN WG1 Meeting #60; R1-101101; "PH reporting for Carrier Aggregation"; Research in Motion UK Limited; Agenda Item 7.1.5 for Discussion and Decision; San Francisco, USA, Feb. 22-26, 2010; pp. 1-2.

Alcatel-Lucent Shanghai Bell et al., "Power headroom reporting for carrier aggregation", 3GPP TSG-RAN WG1 #60bis, R1-101852, Apr. 12-16, 2010, 3pgs.

Ericsson et al., "Uplink Power Control for Carrier Aggregation", 3GPP TSG RAN WG1, Meeting #58bis, R1-094274, Oct. 12-16, 2009, 4 pgs.

Nokia Siemens Networks et al., "UL control singnalling to support bandwidth extension in LTE-Advanced", 3GPP TSG RAN WG1 Meeting #55bis, R1-090234, Jan. 12-16, 2009, 5 pgs.

LG Electronics, "Further details on UL power control methods in LTE-Advanced," 3GPP TSG RAN WG1 #60, R1-101349, San Francisco, USA, Feb. 22-26, 2010, pp. 1-4.

METHOD AND APPARATUS FOR CONTROLLING UPLINK POWER IN A WIRELESS ACCESS SYSTEM

CROSS-REFERENCE TO RELATED APPLICATIONS

This application is a Continuation of co-pending U.S. application Ser. No. 13/894,258 filed on May 14, 2013, which is a Continuation of application Ser. No. 13/513,085 filed on Aug. 9, 2012 (granted as U.S. Pat. No. 8,462,705), which is a National Phase of PCT/KR2011/002286 filed on Apr. 1, 2011, which claims priority under 35 U.S.C. §119(e) to U.S. Provisional Application Nos. 61/320,285 filed on Apr. 1, 2010 and 61/324,728 filed on Apr. 15, 2010, all of which are hereby expressly incorporated by reference into the present application.

BACKGROUND OF THE INVENTION

Description of the Related Art

The present invention relates to a communication method and apparatus used in a wireless access system, and more particularly, to a method for reporting power headroom (PH) of a user equipment in a multicarrier environment and an apparatus for supporting the same.

In a general wireless access system, only a single carrier may be considered even though bandwidths between an uplink and a downlink are set up to be different from each other. For example, on the basis of a single carrier, a wireless communication system may be provided, in which the number of carriers constituting the uplink and the number of carriers constituting the downlink may be 1, respectively, and a bandwidth of the uplink is symmetrical to that of the downlink.
compared with a wireless communication system according to the related art. However, except for some areas of the world, it is difficult to allocate frequencies of wide bandwidths. Therefore, as a technique for effectively using fragmented small bands, a carrier aggregation (bandwidth aggregation or spectrum aggregation) technique is being developed to obtain the same effect as when a band of a logically wide bandwidth is used by physically aggregating a plurality of bands in a frequency domain.

The carrier aggregation is introduced to support increased throughput, prevent the cost from being increased by a wideband RF device, and ensure compatibility with the existing system. The carrier aggregation refers to a technique of enabling data exchange between a user equipment and a base station through a plurality of groups of carriers of a bandwidth unit defined in the existing wireless communication system.

In this case, the carriers of a bandwidth unit defined in the existing wireless communication system may be referred to as component carriers (CC). For example, the carrier aggregation technique may include a technique for supporting a system bandwidth of maximum 100 MHz by using maximum five component carriers even if one component carrier supports a bandwidth of 5 MHz, 10 MHz or 20 MHz.

If the carrier aggregation technique is used, data may simultaneously be transmitted and received through several uplink/downlink component carriers. Accordingly, the user equipment may monitor and measure all the component carriers.

In the existing communication system, it was sufficient to report the residual quantity of an uplink transmission power of a user equipment for one carrier. However, as a communication environment is developed, a carrier matching technology that two or more carriers are matched with one another is required to cover a frequency range of maximum 100 MHz.

Accordingly, when a user equipment has a plurality of uplink component carriers (that is, serving cell), it is required that a technology for reporting power headroom (PH) of a user equipment should be developed in a different manner of the existing method.

An object of the present invention devised to solve the conventional problem is to provide various methods for reporting power headroom of a user equipment in a carrier matching multi-carrier environment and apparatuses for supporting the same.

It will be appreciated by persons skilled in the art that the objects that could be achieved with the present invention are not limited to what has been particularly described hereinabove and the above and other objects that the present invention could achieve will be more clearly understood from the following detailed description.

To solve the aforementioned technical problem, the present invention provides a method for reporting power headroom (PH) of a user equipment in a multicarrier environment and apparatuses for supporting the same.

In one aspect of the present invention, a method for reporting power headroom of a user equipment of a multi-carrier system comprises the steps of receiving a physical downlink control channel (PDCCH) signal comprising uplink resource allocation information from a base station; transmitting at least one of a physical uplink shared channel (PUSCH) signal and the physical uplink control channel (PUCCH) signal to the base station for a predetermined subframe on the basis of the uplink resource allocation information in accordance with a transmission mode; calculating one or more power headroom values for the predetermined subframe in accordance with the transmission mode; and reporting the one or more power headroom values to the base station, wherein the user equipment reports a first type power headroom value and a second type power headroom value for the predetermined subframe when the user equipment operates in transmission mode A, and reports its first type power headroom value when the user equipment operates in transmission mode B.

In another aspect of the present invention, the method may further comprise transmitting a physical downlink control channel (PDCCH) signal comprising uplink resource allocation information to the user equipment, receiving at least one of a physical uplink shared channel (PUSCH) signal and the physical uplink control channel (PUCCH) signal for a predetermined subframe on the basis of the uplink resource allocation information in accordance with a transmission mode of the user equipment, and receiving a report message (for example, extended power headroom MAC control element) comprising one or more power headroom values from the user equipment. In this case, the one or more power headroom values may be calculated in accordance with the transmission mode of the user equipment, and if the user equipment operates in the transmission mode A, the power headroom value may be a first type power headroom value and a second type power headroom value for the predetermined subframe, and if the user equipment operates in the transmission mode B, the power headroom value may be the first type power headroom value.

In still another aspect of the present invention, a user equipment for performing power headroom report in a multi-carrier system comprises a reception module for receiving a channel signal; a transmission module for transmitting the channel signal; and a processor supporting a function for performing the power headroom report.

In this case, the user equipment receives a physical downlink control channel (PDCCH) signal comprising uplink resource allocation information from a base station by using the reception module, transmits at least one of a physical uplink shared channel (PUSCH) signal and the physical uplink control channel (PUCCH) signal to the base station through the transmission module for a predetermined subframe on the basis of the uplink resource allocation information in accordance with a transmission mode, calculates one or more power headroom values for the predetermined subframe through the processor, reports the one or more power headroom values to the base station through the transmission module in accordance with the transmission mode. In particular, the user equipment reports its first type power headroom value and second type power headroom value for the predetermined subframe to the base station when the user equipment operates in transmission mode A, and reports its first type power headroom value to the base station when the user equipment operates in transmission mode B.

In further still another aspect of the present invention, a base station supporting a power headroom report method in a multi-carrier system comprises a reception module for receiving a channel signal, a transmission module for transmitting the channel signal, and a processor supporting a function for supporting power headroom report.

The base station transmits a physical downlink control channel (PDCCH) signal comprising uplink resource allocation information to a user equipment by using the reception module, receives at least one of a physical uplink shared channel (PUSCH) signal and the physical uplink control channel (PUCCH) signal from the user equipment through the reception module for a predetermined subframe on the basis of the uplink resource allocation information in accordance with a transmission mode, and receives a report message comprising one or more power headroom values for the predetermined subframe from the user equipment through the reception module. At this time, the one or more power headroom values are reported in accordance with the transmission mode of the user equipment. In particular, when the user equipment operates in transmission mode A, the power headroom value may be the first type power headroom value and the second type power headroom value for the predetermined subframe, and when the user equipment operates in transmission mode B, the power headroom value may be the first type power headroom value.

In the above aspects of the present invention, if the user equipment operates in the transmission mode A, it transmits the PUSCH signal and the PUCCH signal to the base station for the predetermined subframe of a primary (P) cell, and if the user equipment operates in the transmission mode B, it transmits the PUSCH signal to the base station for the predetermined subframe of a serving cell.

In the transmission mode A, the PUCCH signal and the PUSCH signal may be simultaneously transmitted through a PUCCH region and a PUSCH region, respectively, and in the transmission mode B, the PUCCH signal may be subjected to piggyback into the PUSCH signal and transmitted through the PUSCH region.

At this time, the first type power headroom value may be calculated using a maximum transmission power of the user equipment and a transmission power of the PUSCH signal, and the second type power headroom value may be calculated using the maximum transmission power of the user equipment, the transmission power of the PUSCH signal, and a transmission power of the PUCCH signal.

Also, the first type power headroom value may be calculated using a difference value between the maximum transmission power of the user equipment and the transmission power of the PUSCH signal, and the second type power headroom value may be calculated using a difference value between the maximum transmission power of the user equipment and the sum of the transmission power of the PUSCH signal, and the transmission power of the PUCCH signal.

In the above aspects of the present invention, the second type power headroom may be calculated as expressed by Equation 2. At this time, $P_{CMAXc}$ represents the maximum transmission power of the user equipment, $P_{PUSCH\_scheduled}(i)$ represents the transmission power of the PUSCH signal, and $P_{PUCCH\_scheduled(i)}$ represents the transmission power of the PUCCH signal. Also, the second type power headroom value may be calculated using the transmission power of the PUCCH signal even though the PUCCH signal is not transmitted for the predetermined subframe. At this time, the second type power headroom value may be calculated as expressed by Equation 6. Also, the first type power headroom value may be calculated using Equation 1.

In the above aspects of the present invention, the report message may further include a maximum transmission power value at a primary (P) cell or serving cell of the user equipment.

The aspects of the present invention are only a part of the preferred embodiments of the present invention, and various embodiments based on technical features of the present invention may be devised and understood by the person with ordinary skill in the art based on the detailed description of the present invention.

SUMMARY OF THE INVENTION

According to the embodiments of the present invention, the following advantages may be obtained.

If one or more serving cells are allocated to a user equipment, uplink resources may efficiently be allocated to the user equipment by using various methods for reporting power headroom of the user equipment for each cell.

Also, in a carrier aggregation environment, the method for reporting power headroom of a user equipment may be used if the user equipment is allocated with one or more cells. Accordingly, even in the case that PUCCH and PUSCH signals are simultaneously transmitted, the method for reporting power headroom of a user equipment may be used efficiently.

It will be appreciated by persons skilled in the art that that the effects that could be achieved with the present invention are not limited to what has been particularly described hereinabove and other advantages of the present invention will be more clearly understood from the following detailed description.

DETAILED DESCRIPTION OF THE INVENTION

Figure 1:
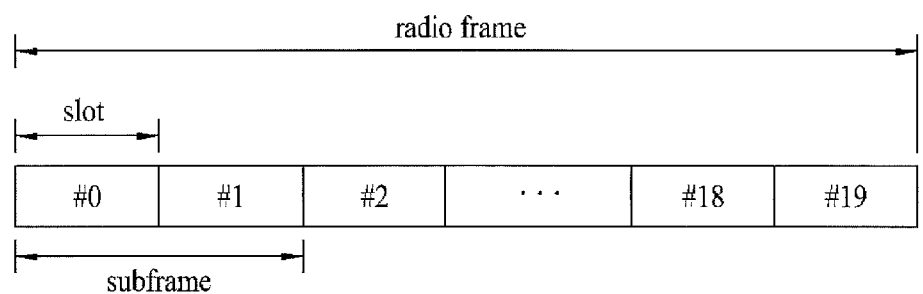
FIG. 1 is a diagram illustrating a structure of a radio frame that may be used in the embodiments of the present invention.

The embodiments of the present invention disclose various methods for reporting power headroom (PH) of a user equipment in a multicarrier environment and apparatuses for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP).

Also, the mobile station may be replaced with terms such as a user equipment (UE), a subscriber station (SS), a mobile subscriber station (MSS), an advanced mobile station (AMS) or a terminal.

Furthermore, a transmitting side means a fixed or mobile node that transmits data services or voice services while a receiving side means a fixed or mobile node that receives data services or voice services. Accordingly, in an uplink, the mobile station could be a transmitting side while the base station could be a receiving side. Likewise, in a downlink, the mobile station could be a receiving side while the base station could be a transmitting side.

The embodiments of the present invention may be supported by standard documents disclosed in at least one of wireless access systems, i.e., IEEE 802 system, 3GPP system, 3GPP LTE system, and 3GPP2 system. Particularly, the embodiments of the present invention may be supported by one or more of documents of 3GPP TS 36.211, 3GPP TS 36.212, 3GPP TS 36.213, and 3GPP TS 36.321. Namely, among the embodiments of the present invention, steps or parts which are not described to clarify the technical features of the present invention may be supported by the above standard documents. Also, all terminologies disclosed herein may be described by the above standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications may be made in the specific terminologies within the range that they do not depart from technical spirits of the present invention.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access).

The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA).

The UTRA is a part of a universal mobile telecommunications system (UMTS). A 3$^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. Although the following description will be based on the 3GPP LTE/LTE-A to clarify description of technical features, it is to be understood that technical spirits of the present invention are not limited to the 3GPP LTE/LTE-A.

1. Basic Structure of 3GPP LTE/LTE-A System

FIG. 1 is a diagram illustrating a structure of a radio frame that may be used in the embodiments of the present invention.

A radio frame includes ten (10) subframes, each of which includes two slots. The time required to transmit one subframe will be defined as a transmission time interval (TTI). At this time, one subframe has a length of 1 ms, and one slot has a length of 0.5 ms.

One slot includes a plurality of orthogonal frequency division multiplexing (OFDM) symbols in the time domain and a plurality of resource blocks (RBs) in a frequency domain. The OFDM symbols represent one symbol period in the 3GPP LTE system that uses an orthogonal frequency division multiplexing access (OFDMA) scheme in a downlink. Namely, the OFDM symbols may be referred to as SC-FDMA symbols or symbol duration depending on multiple access system. A resource block (RB) is a resource allocation unit, and includes a plurality of continuous subcarriers in one slot.

The structure of the radio frame in FIG. 1 is only exemplary, and various modifications may be made in the number of subframes included in the radio frame, the number of slots included in one subframe, or the number of OFDM symbols included in one slot.

Figure 2:
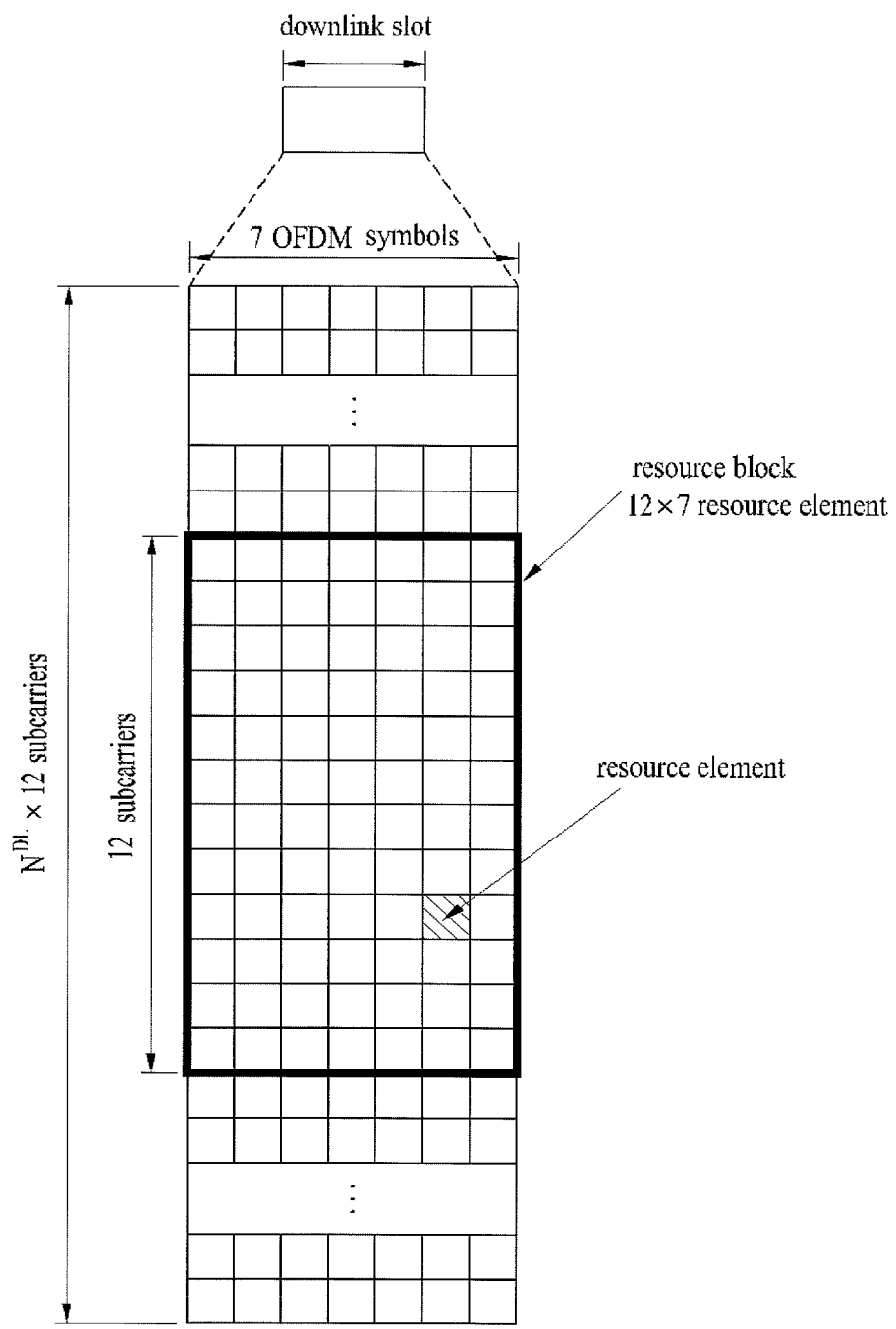
FIG. 2 is a diagram illustrating a resource grid for one downlink slot that may be used in the embodiments of the present invention.

FIG. 2 is a diagram illustrating a resource grid for one downlink slot that may be used in the embodiments of the present invention.

The downlink slot includes a plurality of OFDM symbols in a time domain. In an example of FIG. 2, one downlink slot includes seven OFDM symbols, and one resource block includes 12 subcarriers in a frequency domain.

Each element on a resource grid will be referred to as a resource element (RE). One resource block (RB) includes 12×7 resource elements (REs). The number $N^{DL}$ of resource blocks included in the downlink slot is subjected to a downlink transmission bandwidth set in a cell.

Figure 3:
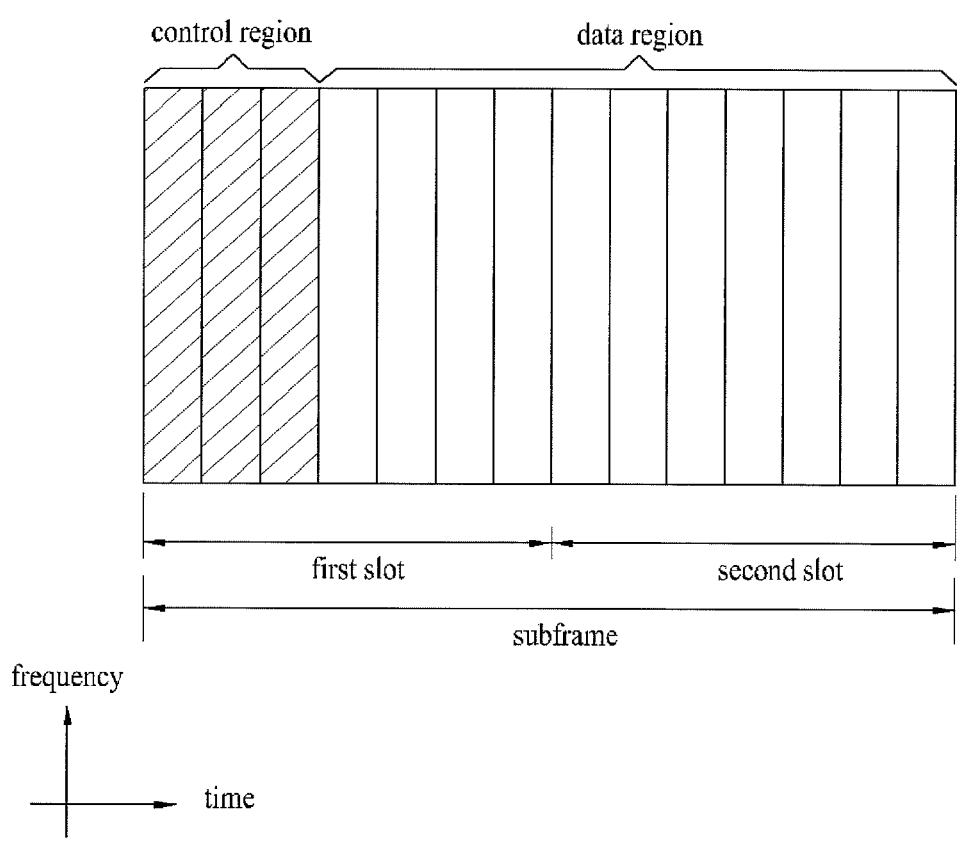
FIG. 3 is a diagram illustrating a structure of a downlink subframe that may be used in the embodiments of the present invention.

FIG. 3 is a diagram illustrating a structure of a downlink subframe that may be used in the embodiments of the present invention.

The downlink subframe includes two slots in a time domain. Maximum three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH signal transmitted from the first OFDM symbol of the subframe carries information on the number (that is, size of control region) of OFDM symbols used for transmission of the control channels within the subframe. The PHICH carries ACK/NACK (acknowledgement/negative-acknowledgement) signal in response to uplink HARQ (Hybrid Automatic Repeat Request). In other words, the ACK/NACK signal for the uplink data transmitted from the user equipment is transmitted onto the PHICH.

The control information transmitted through the PDCCH will be referred to as downlink control information (DCI). The DCI includes resource allocation information for user equipment or user equipment group and other control information. For example, the DCI may include uplink resource allocation information, downlink resource allocation information and uplink transmission power control command.

The PDCCH may carry transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control command, and activity information of voice over Internet protocol (VoIP).

A plurality of PDCCHs may be transmitted from one control region. The user equipment may monitor the plurality of PDCCHs. The PDCCH is transmitted on one or more continuous control channel elements (CCEs). The CCE is a logic allocation resource used to provide the PDCCH at a single coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI to be transmitted to the user equipment, and attaches cyclic redundancy check (CRC) to the control information.

The CRC is masked with an identifier (for example, radio network temporary identifier (RNTI)) depending on usage of the PDCCH or owner of the PDCCH. If the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. Also, if the PDCCH is for system information (in more detail, system information block (SIB)), a system information identifier and system information RNTI (S-RNTI) may be masked with the CRC. In order to indicate a random access response which is the response to reception of a random access preamble of the user equipment, a random access RNTI (RA-RNTI) may be masked with the CRC.

The PDCCH may be transmitted through one or more component carriers in a carrier aggregation environment, and may include resource allocation information on one or more component carriers. For example, although the PDCCH is transmitted through one component carrier, it may include resource allocation information on one or more PDSCHs and PUSCHs.

Figure 4:
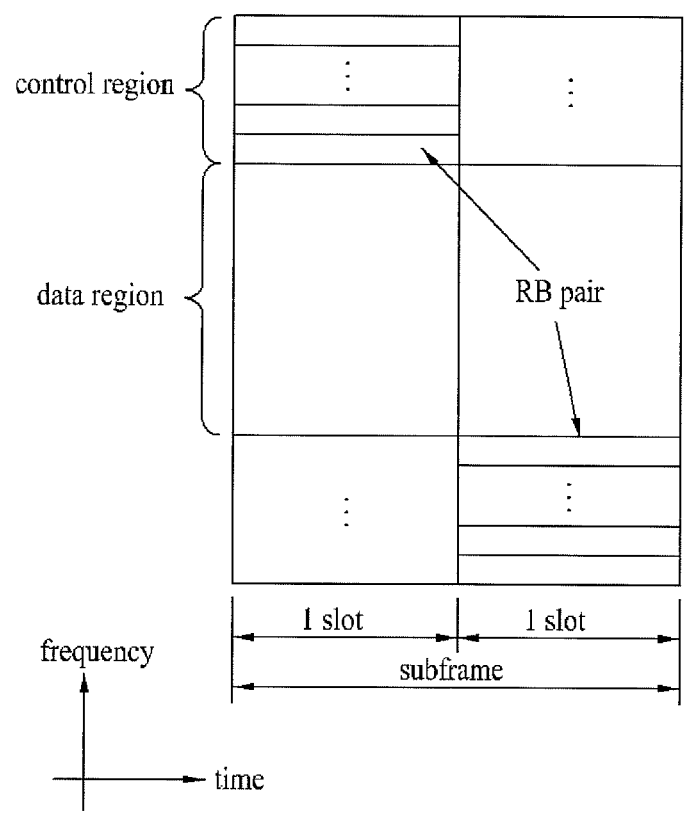
FIG. 4 is a diagram illustrating a structure of an uplink subframe that may be used in the embodiments of the present invention.

FIG. 4 is a diagram illustrating an example of a structure of an uplink subframe that may be used in the embodiments of the present invention Referring to FIG. 4, the uplink subframe includes a plurality of slots (for example, two slots). The slot may include a number of SC-FDMA symbols different from the number of SC-FDMA symbols of the other slot. The uplink subframe may be divided into a control region and a data region on a frequency domain. The data region includes a physical uplink shared channel (PUSCH), and is used to transmit a data signal that includes voice information. The control region includes a physical uplink control channel (PUCCH), and is used to transmit uplink control information (UCI). The PUCCH includes RB pair located at both ends of the data region on the frequency axis and performs hopping at a slot boundary. In the LTE system, in order to maintain single carrier features, the user equipment does not transmit the PUCCH signal and the PUSCH signal at the same time.

The PUCCH for one user equipment is allocated to resource block (RB) pair for one subframe. Resource blocks (RBs) belonging to the RB pair occupy different subcarriers for two slots. It means that the RB pair allocated to the PUCCH is subjected to frequency hopping at a slot boundary.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to a downlink data packet on the PDSCH. It represents whether the downlink data packet has been successfully received. ACK/NACK 1 bit is transmitted in response to a single downlink codeword, and ACK/NACK 2 bits are transmitted in response to two downlink codewords.

CQI (Channel Quality Indicator): is feedback information on a downlink channel. MIMO (Multiple Input Multiple Output) related feedback information includes a rank indicator (RI) and a precoding matrix indicator (PMI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbols of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a PUCCH format and a mapping relation of UCI in the LTE.

TABLE 1

| PUCCH format | UCI |
|---|---|
| Format 1 | Scheduling request (SR) |
| Format 1a | 1 bit HARQ ACK/NACK that includes SR or does not include SR |
| Format 1b | 2 bit HARQ ACK/NACK that includes SR or does not include SR |
| Format 2 | CQI(20 coded Bits) |
| Format 2 | CQI and 1 or 2 bit HARQ ACK/NACK for extended CP |
| Format 2a | CQI and 1 bit HARQ ACK/NACK |
| Format 2b | CQI and 2 bit HARQ ACK/NACK |

2. Multi-Carrier Environment

A communication environment considered by the embodiments of the present invention includes a multi-carrier environment. In other words, a multi-carrier system or carrier aggregation system used in the present invention means a system that one or more carriers having a bandwidth smaller than a target bandwidth are aggregated when a target wideband is configured to support a wideband.

In the present invention, multi-carrier means aggregation of carriers (or carrier aggregation). At this time, carrier aggregation means aggregation between non-neighboring carriers as well as aggregation between neighboring carriers. Also, carrier aggregation may be used to refer to bandwidth aggregation.

Multi-carrier (that is, carrier aggregation) configured by aggregation of two or more component carriers (CC) aims to support a bandwidth of 100 MHz in the LTE-A system. When one or more carriers having a bandwidth smaller than a target bandwidth are aggregated, a bandwidth of the aggregated carriers may be limited to a bandwidth used in the existing system to maintain backward compatibility with the existing IMT system.

For example, the 3GPP LTE system (LTE R-8 system) supports bandwidths of {1.4, 3, 5, 10, 15, 20} MHz, and the 3GPP LTE_advanced system (that is, LTE_A) may support a bandwidth greater than 20 MHz using the above bandwidths supported by the LTE system. Also, the multi-carrier system used in the present invention may support carrier aggregation by defining a new bandwidth regardless of the bandwidth used in the existing system.

Figure 5:
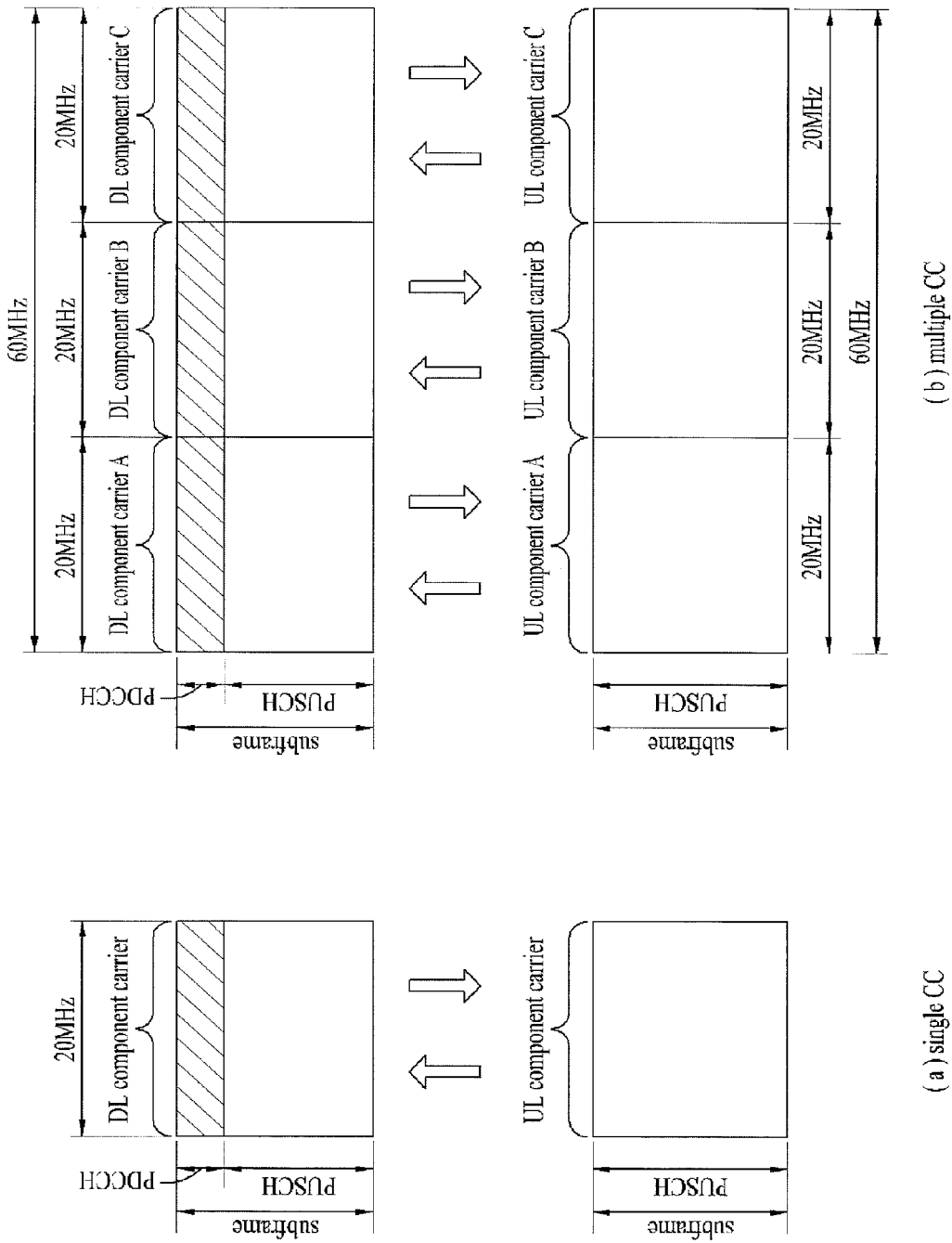
FIG. 5 is a diagram illustrating an example of a component carrier (CC) of an LTE system and multicarrier aggregation (carrier aggregation) used in an LTE-A system.

FIG. 5 is a diagram illustrating an example of a component carrier (CC) of an LTE system and multicarrier aggregation (carrier aggregation) used in an LTE-A system.

FIG. 5(a) illustrates a single carrier structure used in the LTE system. The component carrier includes a downlink component carrier (DL CC) and an uplink component carrier (UL CC). One component carrier may have a frequency range of 20 MHz.

FIG. 5(b) illustrates a multi-carrier structure used in the LTE_A system. In FIG. 5(b), three component carriers having a frequency size of 20 MHz are aggregated. In case of multi-carrier aggregation, the user equipment may monitor three component carriers at the same time, receive downlink signal/data and transmit uplink signal/data.

If N DL CCs are managed by a specific base station (eNB: e-NodeB) region, the network may allocate M (M≤N) number of DL CCs to the user equipment. At this time, the user equipment may monitor M number of limited DL CCs only and receive DL signal. Also, the network may give L (L≤M≤N) number of DL CCs a priority and allocate them to the user equipment as main DL CCs. In this case, the user equipment should L number of DL CCs necessarily. This system may also be applied to uplink transmission.

The LTE-A system uses a concept of cell to manage a radio resource. The cell is defined by combination of downlink resources and uplink resources, wherein the uplink resources may be defined selectively. For example, the cell may be configured by downlink resources only, or may be configured by downlink resources and uplink resources. If multi-carrier (that is, carrier aggregation) is supported, linkage between carrier frequency (or DL CC) of the downlink resources and carrier frequency (or UL CC) of the uplink resources may be indicated by system information. In other words, one cell may include one or more downlink component carriers, and may selectively include one or more uplink component carriers.

The cell used in the LTE-A system includes a primary cell (PCell) and a secondary cell (SCell). The P cell may mean a cell operated on the primary frequency (or primary CC), and the S cell may mean a cell operated on the secondary frequency (or secondary CC). However, a single P cell may be allocated to a specific user equipment and one or more S cells may be allocated to the specific user equipment.

The P cell is used such that the user equipment performs an initial connection establishment procedure or connection re-establishment procedure. The P cell may refer to a cell indicated during a handover procedure. The S cell may be configured after RRC connection is established, and may be used to provide an additional radio resource.

The P cell and the S cell may be used as serving cells. Although the user equipment is in RRC-CONNECTED state, if it is not set by carrier aggregation or does not support carrier aggregation, a single serving cell configured by the P cell exists. On the other hand, if the user equipment is in the RRC-CONNECTED state and is set by carrier aggregation, one or more serving cells may exist, wherein the serving cells may include a P cell and one or more S cells.

After an initial security activity procedure starts, the E-UTRAN may configure a network that includes one or more S cells in addition to a P cell initially configured during a connection establishment procedure. In the multi-carrier environment, the P cell and the S cell may be operated as component carriers, respectively. In other words, carrier matching may be understood by aggregation of the P cell and one or more S cells. In the following embodiment, the primary component carrier (PCC) may be used to refer to the P cell, and the secondary component carrier (SCC) may be used to refer to the S cell.

Figure 6:
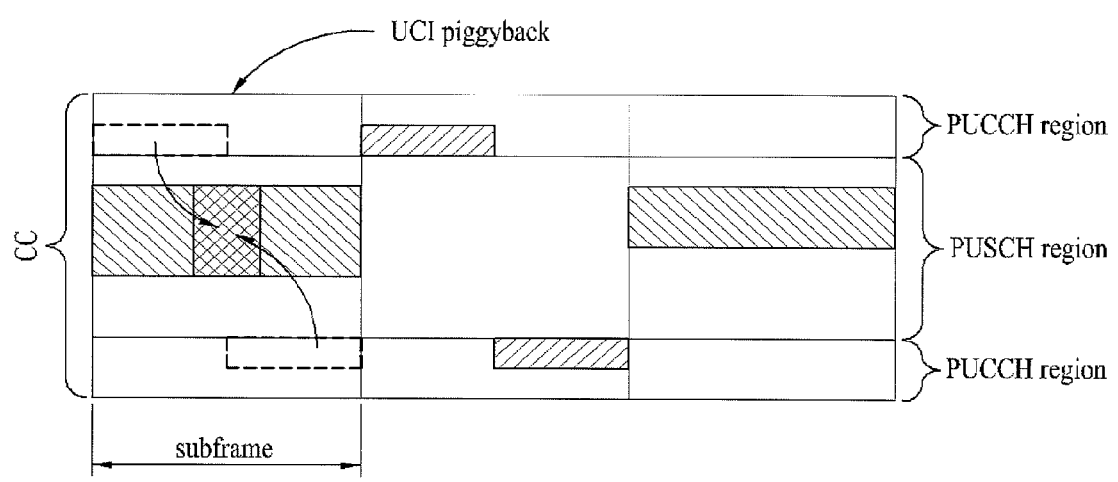
FIG. 6 is a diagram illustrating a case where a PUCCH signal is subjected to piggy back in a PUSCH region.

FIG. 6 is a diagram illustrating a case where a PUCCH signal is subjected to piggy back in a PUSCH region.

Referring to FIG. 6, the first subframe illustrates that a PUCCH signal and a PUSCH signal are transmitted at the same time, and the second and third subframes illustrate that the PUCCH signal and the PUSCH signal are respectively transmitted from the PUCCH region and the PUSCH region.

However, in the 3GPP LTE system (R-8), in case of uplink, in order to efficiently use a power amplifier of the user equipment, it is preferable to maintain single carrier property having good peak-to-average power ratio (PAPR) feature or good cubic metric (CM) feature, wherein the PAPR feature acts on throughput of the power amplifier.

For example, if the user equipment transmits the PUSCH signal, the single carrier property may be maintained through DFT-precoding for data which will be transmitted. If the user equipment transmits the PUCCH signal, the single carrier property may be maintained in such a manner that the PUCCH signal is carried in the sequence having the single carrier property.

However, if the DFT-precoded data are allocated discontinuously on the frequency axis, or if the PUSCH signal and the PUCCH signal are transmitted at the same time, the single carrier property may be removed. Accordingly, if PUSCH transmission is performed for the same subframe as that for PUCCH transmission as shown in FIG. 6, uplink control information (UCI) which will be transmitted to the PUCCH may be subjected to piggyback together with general data through the PUSCH, whereby the single carrier property may be maintained.

3. Power Headroom Report Method

In order that the base station (eNB: eNode-B) properly schedules uplink transmission resources for a plurality of user equipments, it is preferable that each user equipment reports its possible power headroom information to the base station. The base station may use the power headroom report (PHR) received from each user equipment to determine an available uplink bandwidth per subframe. This method may properly distribute the uplink resources allocated to the user equipment, whereby each user equipment may be prevented from being allocated with unnecessary uplink resources.

The power headroom report is performed in 1 dB unit, and is in the range of 40 dB to −23 dB. In this case, the range of '−' value represents the range that each user equipment transmit a signal to the base station using transmission power more than that allocated through UL grant.

The PHR may allow the base station to reduce the size (that is, the number of RBs in the frequency domain) of next UL grant, and may release transmission resources which will be transmitted to the other user equipments. The PHR may be transmitted for the subframe having uplink transmission grant. The PHR is related with the subframe for which the PHR is transmitted.

In the 3GPP LTE system, a method for calculating a PHR value in a user equipment is as expressed by the following Equation 1.

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\}$$ [Equation 1]

In this case, $P_{CMAX}$ represents a theoretical maximum transmission power of the user equipment, and $M_{PUSCH}(i)$ is a parameter indicating a bandwidth of PUSCH resource allocation expressed as the number of effective resource blocks for the subframe of index i and is a value allocated from the base station.

$P_{O\_PUSCH}(j)$ is a parameter configured by the sum of a cell-specific nominal component $P_{O\_NOMINAL\_PUSCH}(j)$ provided from the upper layer and a user equipment-specific component $P_{O\_UE\_PUSCH}(j)$ provided from the upper layer, and is a value notified from the base station to the user equipment.

$\alpha(j)$ is a cell-specific parameter provided from the upper layer and transmitted by the base station as 3 bits, and when j=0 or 1, $\alpha \in \{0, 0.4, 0.5, 0.6, 0.7, 0.8, 0.9, 1\}$, and when j=2, $\alpha(j)=1$. $\alpha(j)$ is a value notified from the base station to the user equipment.

PL is an estimated value of downlink path loss (PL: Path-Loss) calculated by the user equipment in a unit of dB, and is expressed as PL=referenceSignalPower−higher layer filteredRSRP. f(i) is a value indicating the current PUSCH power control adjustment state, and may be expressed as a current absolute value or accumulated value.

The power headroom (PH) is configured by 64 level value of 1 dB interval between −23 dB and 40 dB, and is forwarded from the physical layer to the upper layer. The PH MAC control element is identified by the MAC PDU subheader.

4. Power Headroom Report Method I in Carrier Aggregation Environment

In a carrier aggregation environment, one or more serving cells may be allocated to each user equipment. One of the serving cells may be a P cell. In this case, in the LTE-A system, it is preferable that the user equipment performs a PHR procedure for one or more serving cells unlike the existing LTE system. Accordingly, a method for performing a PHR procedure when P cell and one or more S cells are allocated to a user equipment will hereinafter be described in detail.

The PHR procedure means that the user equipment calculates a PH for a cell allocated from its physical layer and reports the calculated PH to the base station.

For example, the user equipment may provide the base station with information (for example, first type ePH value) on the difference between the theoretical maximum transmission power of the user equipment at each activated serving cell and a transmission power of the user equipment, which is measured for the uplink shared channel (UL-SCH, PDSCH, etc.).

Also, the user equipment may provide the base station with information (for example, second type ePH value) on the difference between the theoretical maximum transmission power of the user equipment and a transmission power of the user equipment, which is measured for the uplink shared channel (UL-SCH) and the PUCCH at the P cell, and information (for example, second type ePH value) on the difference between the theoretical maximum transmission power of the user equipment and a transmission power of the user equipment, which is measured for the uplink shared channel (UL-SCH, PDSCH, etc.).

The embodiments of the present invention are applied to the LTE-A system, and the PHR of the present invention will be referred to as an extended PHR (ePHR) to distinguish the PHR of the existing LTE R-8 from the PHR of the present invention. In other words, the user equipment may transmit the first type ePH value to the base station in the serving cell and transmit the first type ePH value and the second ePH value to the base station in the P cell to perform the ePHR procedure. At this time, the user equipment may transmit the PH values to the base station together with the information on the maximum transmission power of the user equipment.

For example, the physical layer of the user equipment calculates a power headroom (first ePH) value for the PUSCH of the activated serving cell, and forwards the first type ePH value and information on the maximum transmission power $P_{MAX,c}$ of the user equipment to the upper layer (for example, MAC or RRC layer) of the user equipment. The upper layer of the user equipment may transmit the first type ePH and the information on $P_{MAX,c}$ to the base station.

Also, the physical layer of the user equipment may calculate the first type ePH, the second type ePH and the maximum transmission power $P_{MAX,c}$ of the user equipment at the activated P cell and forward the calculated values to the upper layer of the user equipment, and the upper layer of the user equipment may transmit the second type PHR information and information on $P_{MAX,c}$ to the base station.

Figure 7:
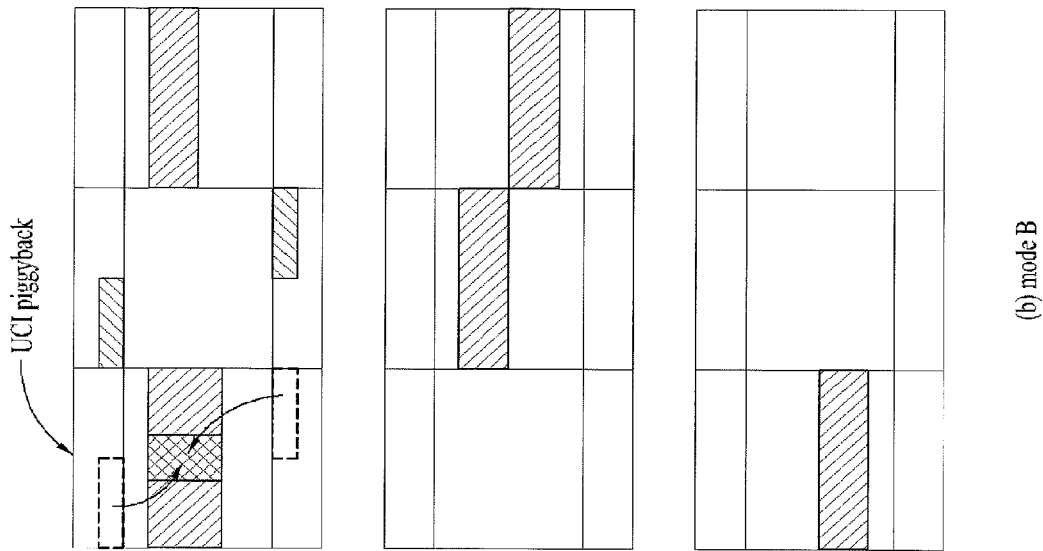
FIG. 7 is a diagram illustrating a method for transmitting a PUCCH signal and a PUSCH signal of a user equipment in accordance with a transmission mode.
Figure 7:
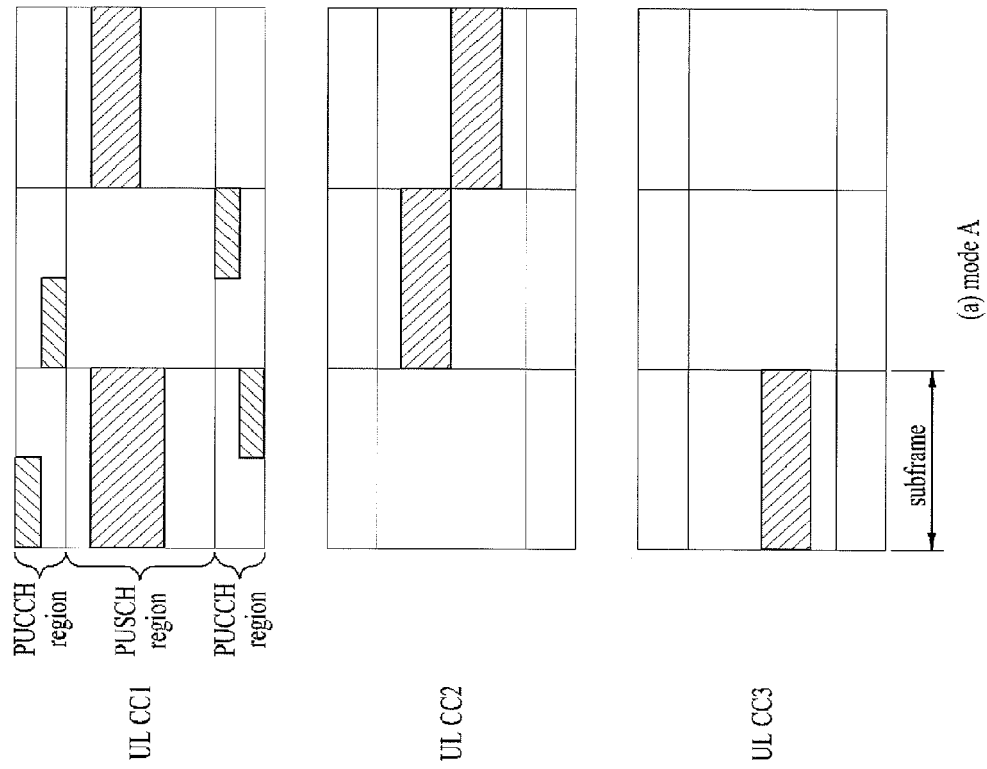

FIG. 7 illustrates that the user equipment transmits a data signal and a control signal using three serving cells (e.g., UL CC). In FIG. 7, UL CC1 represents a P cell, and the user equipment may transmit a control signal (UCI, that is, PUCCH signal) and a data signal (for example, PUSCH signal) through the P cell. Also, UL CC2 and UL CC3 represent the S cells, and the user equipment may transmit the PUSCH signal through the S cell. At this time, FIG. 7(a) illustrates that the user equipment is operated in accordance with mode A, and FIG. 7(b) illustrates that the user equipment is operated in accordance with mode B.

The mode A illustrates that the user equipment may simultaneously transmit the PUSCH signal and the PUCCH signal for the same subframe. For example, the user equipment of the mode A transmits the PUCCH signal and the PUSCH signal for the first subframe of the P cell (that is, UL CC1) at the same time, transmits the PUCCH signal only for the second subframe, and transmits the PUSCH signal only for the third subframe. Also, the user equipment may transmit the PUSCH signal through the PUSCH region at the S cell (that is, UL CC2 and UL CC3).

The mode B illustrates that user equipment does not simultaneously transmit the PUSCH signal and the PUCCH signal for the same subframe. For example, the user equipment of the mode B may transmit the PUCCH signal (UCI) at the UL CC1 (serving cell) through piggybacking or multiplexing the signal into the PUSCH signal. In other words, the user equipment may transmit the control signal (e.g., UCI) through piggyback with the data signal in the PUSCH region without transmitting the control signal through the PUCCH region.

Accordingly, if the user equipment is configured by the mode A, it may calculate the first type power headroom value and the second type power headroom value and report the calculated values to the base station. Also, if the user equipment is configured by the mode B, it may calculate the first type power headroom value and report the calculated value to the base station.

Although the method for transmitting the uplink control signal and data signal in the P cell has been described in FIG. 7, the control signal and data signal may be transmitted in an arbitrary serving cell which is not the P cell. Hereinafter, in the case where the PUSCH signal and the PUCCH signal are simultaneously transmitted in a specific serving cell like the mode A and the case where the PUCCH signal is piggybacked into the PUSCH signal in a specific serving cell like the mode B, a method for transmitting power headroom report (PHR) from a user equipment to a base station will be described.

Figure 8:
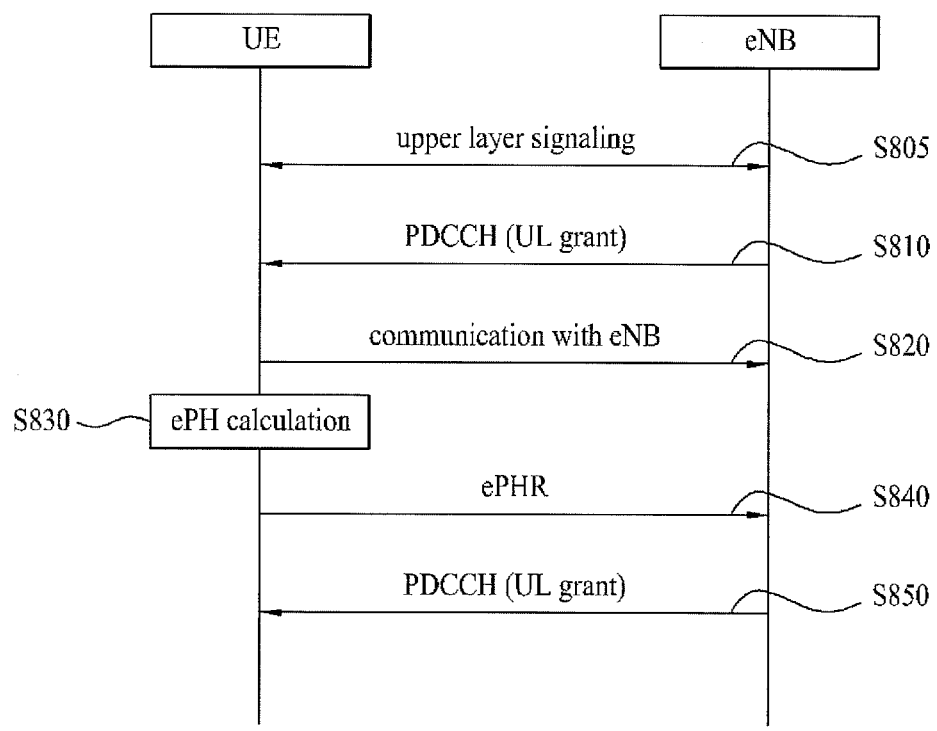
FIG. 8 is a diagram illustrating an example of a method for reporting power headroom of a user equipment based on a transmission mode in accordance with the embodiment of the present invention.

FIG. 8 is a diagram illustrating an example of a method for reporting power headroom of a user equipment based on a transmission mode in accordance with the embodiment of the present invention.

The user equipment UE may negotiate with the base station eNB through upper layer signaling as to which mode is used to operate the user equipment. In other words, the user equipment may be operated by the transmission mode A or B described in FIG. 7 in accordance with the negotiation result with the base station.

The user equipment UE may receive a PDCCH signal, which includes uplink resource allocation information (e.g., UL grant) on one or more serving cells, in a carrier aggregation (CA) environment (S810).

At the step S810, the user equipment may be allocated with one or more cells (that is, one or more CCs). At this time, the user equipment may be operated by the same transmission mode or independent transmission per allocated cell.

The user equipment may perform communication with the base station through the allocated uplink. In other words, the user equipment may transmit PUCCH and/or PUSCH signals to the base station in accordance with the mode A or B for the i-th subframe in one or more cells (S820).

If any one condition of the following events is satisfied, the user equipment may trigger the ePHR procedure. In other words, the user equipment may calculate the first type ePH and/or the second type ePH if (1) a first timer (for example, prohibitPHR-Timer) prohibiting the power headroom report (PHR) expires or the first timer expires in at least one activated serving cell and change of transmission path loss is greater than a previously set value (for example, DL_PathlossChange dB), (2) if a periodic report timer which is a second timer (for example, a PeriodicPHR-Timer) expires, or (3) if a secondary (S) cell having an uplink is activated (S830).

If the user equipment is operated by the transmission mode B, it may report the first type ePH for the current subframe (i) of the serving cell c to the base station. Also, if the user equipment is operated by the transmission mode A, it may report the first type ePH and the second type ePH for the current subframe (i) of the primary (P) cell to the base station.

At the step S830, the first type ePH and/or the second ePH are calculated by the physical layer of the user equipment and then forwarded to the upper layer (for example, MAC layer and/or RRC layer) of the user equipment. For the PHR procedure, the upper layer of the user equipment receives one or more ePH values from the physical layer and reports the received ePH values to the base station. At this time, the user equipment may transmit the ePH values to the base station together with the maximum transmission power value of the user equipment, which is used when each ePH is calculated (S840).

At the step S840, the user equipment may transmit one or more ePH values to the base station by using an extended power headroom MAC control element (for example, report message). Also, if the user equipment is allocated with one or more cells, it may report the ePH for each cell and its maximum transmission power to the base station.

The base station may schedule uplink radio resources based on the one or more ePH values received from each user equipment and allocate the scheduled radio resources to each user equipment. Also, the base station transmits a PDCCH signal, which includes UL grant, to each user equipment to notify the user equipment of information on the radio resources allocated to the user equipment (S850).

At the step S830, the user equipment may calculate ePH for the power of the PUSCH to calculate the first type ePH. At this time, the user equipment may calculate the first type ePH by using the Equation 1. However, parameters at a random subframe i of the serving cell c allocated to the user equipment are used as the parameters of the Equation 1.

At the step S830, the user equipment may calculate ePH for the sum (that is, the sum of PH of the PUSCH and the PUCCH) of the power of the PUSCH and the power of the PUCCH to calculate the second type ePH.

Hereinafter, a method for calculating the second type ePH will be described in detail. The following Equation 2 illustrates one of formulas for calculating the second type ePH.

$$PH_{SUM}(i) = P_{CMAXc} - 10\log_{10}(10^{P_{PUSCHc\_scheduled}(i)/10} + 10^{P_{PUCCH\_scheduled}(i)/10})$$

In the Equation 2, the user equipment calculates ePH by using the amount of power $P_{PUSCHc\_scheduled}(i)$ of the PUSCH and the amount of power $P_{PUCCHc\_scheduled}(i)$ of the PUCCH. In other words, the user equipment may calculate one ePH value using the sum of the power for the PUSCH and the power for the PUCCH. The Equation 2 illustrates that the user equipment transmits the PUSCH signal and the PUCCH signal for the same subframe at the same time.

The following Equation 3 illustrates a formula for calculating the amount of power of the PUSCH used to calculate the second type ePH.

$$P_{PUSCHc\_scheduled}(i) = 10\log_{10}(M_{PUSCHc}(i)) + P_{O\_PUSCH}(j) + \alpha(j) \cdot PL + \Delta_{TFc}(i) + f_c(i)\} \quad \text{[Equation 3]}$$

In this case, $P_{CMAX}$ represents the theoretical maximum transmission power of the user equipment in the P cell or serving cell, and $M_{PUSCH}(i)$ is a parameter indicating a bandwidth of PUSCH resource allocation expressed as the number of effective resource blocks for the subframe of index i and is a value allocated from the base station.

$P_{O\_PUSCH}(j)$ is a parameter configured by the sum of a cell-specific nominal component $P_{O\_NOMINAL\_PUSCH}(j)$ provided from the upper layer and a user equipment-specific component $P_{O\_UE\_PUSCH}(j)$ provided from the upper layer, and is a value notified from the base station to the user equipment.

$\alpha(j)$ is a cell-specific parameter provided from the upper layer and transmitted by the base station as 3 bits, and when j=0 or 1, $\alpha \in \{0, 0.4, 0.5, 0.6, 0.7, 0.8, 0.9, 1\}$, and when j=2, $\alpha(j)=1$. $\alpha(j)$ is a value notified from the base station to the user equipment.

PL is an estimated value of downlink path loss (PL: Path-Loss) calculated by the user equipment in a unit of dB, and is expressed as PL=referenceSignalPower−higher layer filtere-dRSRP. f(i) is a value indicating the current PUSCH power control adjustment state, and may be expressed as a current absolute value or accumulated value.

The following Equation 4 illustrates one of formulas for calculating the amount of power of the PUCCH used in the Equation 2.

$$P_{PUCCH\_scheduled}(i) = P_{O\_PUCCH}(j) + PL + h(n_{CQI}, n_{HARQ}) + \Delta_{F\_PUCCH}(F) + g(i) \quad \text{[Equation 4]}$$

The following Equation 5 illustrates another one of formulas for calculating the amount of power of the PUCCH used in the Equation 2.

$$P_{PUCCH\_scheduled}(i) = P_{O\_PUCCH}(j) + PL + h(n_{CQI}, n_{HARQ}, n_{SR}) + \Delta_{F\_PUCCH}(F) + \Delta T \times D(F') + g(i) \quad \text{[Equation 5]}$$

In the Equations 4 and 5, $\Delta_{F\_PUCCH}(F)$ is a parameter provided from the upper layer of the user equipment to the physical layer, and each $\Delta_{F\_PUCCH}(F)$ value corresponds to a PUCCH format (F) related to the PUCCH format 1a.

If the user equipment transmits the PUCCH on two antenna ports from the upper layer, $\Delta T \times D(F')$ value is provided from each upper layer, where PUCCH format F' is defined, to the lower layer.

$h(n_{CQI}, n_{HARQ})$ and $h(n_{CQI}, n_{HARQ}, n_{SR})$ are subjected to the PUCCH format, wherein $n_{CQI}$ corresponds to the number of information bits for CQI. If the subframe i is configured for scheduling request for the user equipment, $n_{SR}$ is set to 1. If not so, $n_{SR}$ is set to 0. $n_{HARQ}$ represents the number of HARQ bits or the number of transport blocks for the subframe i.

$P_{O\_PUCCH}$ represents a parameter configured by the sum of parameters $P_{O\_NOMIMAL\_PUCCH}$ and $P_{O\_UE\_PUCCH}$ provided from the upper layer. Also, g(i) represents the current PUCCH transmission control adjustment state value, and g(0) represents an initial value after re-establishment.

The following Equation 6 illustrates other one of formulas for calculating the power rate of the PUCCH used in the Equation 2.

$$PH_{SUM}(i) = P_{CMAXc} - 10\log_{10}(10^{P_{PUSCHc\_scheduled}(i)/10} + 10^{(P_{O\_PUCCH}(j)+PL+g(i))/10}) \quad \text{[Equation 6]}$$

The Equation 6 illustrates a method for calculating ePH considering PUCCH power rate even if the user equipment transmits a PUSCH signal only without transmitting a PUCCH signal in a P cell. The Equation 6 is a method for obtaining PH for the sum of the power of the PUSCH currently transmitted and the PUCCH power except for offset related to transport format from the allocation power of the PUCCH. In other words, the amount of power of the PUCCH in the Equation 6 may be obtained by an open-loop parameter $P_{O\_PUCCH}(j)$ of the PUCCH, a path loss compensation value PL of the ith subframe which is the current frame, and a closed-loop parameter value g(i) dynamically accumulated to reach the i-th subframe. The description of each parameter will be understood with reference to the Equations 4 and 5.

5. Power Headroom Report Method II in Carrier Matching Environment

In the above chapter 4, the method for reporting ePHR to a base station by calculating the first type ePH and the second type ePH has been described. Hereinafter, in addition to the method described in the chapter 4, power headroom report methods in a carrier aggregation environment will be described. However, description of basic parameters or description of the transmission mode of the user equipment will be understood with reference to the description of the chapter 4.

If the user equipment is configured by the mode A, the PUSCH and the PUCCH may be simultaneously transmitted in an arbitrary subframe of an arbitrary serving cell. In this case, the base station should properly allocate a PUSCH resource to one or more user equipments, and the user equipment preferably performs scheduling so as not to exceed the limited transmission power of the corresponding serving cell. To this end, as an extended power headroom report (ePHR) methods transmitted from the user equipment to the base station, the following three types of methods may be considered.

(1) Each user equipment may transmit PUSCH power headroom information and PUCCH power headroom information of the corresponding serving cell for all the subframes for which the PHR of the user equipment should be transmitted, to the base station.

(2) As another method, the user equipment configured by the mode A may transmit PUSCH PHR and PUCCH PHR of the P cell (UL CC1) to the base station and notify the base station of PUSCH PHR information only in the S cell (UL CC2, UL CC3) in which the PUSCH is only transmitted.

If the user equipment is configured with the mode B, it does not transmit the PUSCH signal and the PUCCH signal for a random subframe in the PUSCH region and the PUCCH region at the same time to maintain the single carrier property. In this case, in the same manner the LTE system (R-8), since many RBs are not used by PUCCH transmission only of the user equipment in the LTE-A system, it is not likely that power limit of the corresponding CC is exceeded. Also, since the PUCCH signal which is the control signal is transmitted through the PUSCH region by being subjected to piggyback or multiplexing with the PUSCH signal which is the data signal, the user equipment configured by the mode B may not report power headroom for the PUCCH and may transmit the power headroom information only on the PUSCH signal to the base station.

Accordingly, if the user equipment is configured with the mode A, it may transmit the PUSCH and the PUCCH for the same subframe in the P cell. In other words, the user equipment transmits the PUSCH signal and the PUCCH signal in the P cell at the same time. In this case, it is preferable that the user equipment transmits the PHR for the sum of the PHR of the PUSCH and the PHR of the PUCCH to the base station.

If the user equipment is configured with the mode B, the PUCCH signal may be transmitted by being subjected to piggyback or multiplexing with the PUSCH signal as shown in FIG. 7(b) for the subframe where the PUSCH signal and the PUCCH signal should be transmitted. In this case, the user equipment has only to transmit the PHR for the PUSCH to the base station.

Also, unlike the aforementioned methods, even though the PUSCH signal and the PUCCH signal are not transmitted at the same time for the current (ith) subframe, a method for reporting ePH for the sum of the PUSCH power rate and the PUCCH power rate may be considered. In other words, even though the PUSCH signal is only transmitted, the user equipment may report ePH for the sum of the PUSCH power rate and the PUCCH power rate.

The following Equation 7 illustrates another one of methods for calculating ePH for the sum of the PUSCH power rate and the PUCCH power rate.

$$PH_{SUM}(i) = P_{CMAXc} - 10 \log_{10}(10^{P_{PUSCHc\_scheduled}(i)/10} + 10^{P_{PUCCH\_scheduled}(k)/10})$$ [Equation 7]

The Equation 7 illustrates a method for obtaining power headroom (PH) of the user equipment for the sum value of the PUSCH power currently transmitted (i-th subframe) and the PUCCH power most recently transmitted. In other words, in the Equation 7, the PUCCH power is for the k-th (for example, k<i) subframe.

Figure 9:
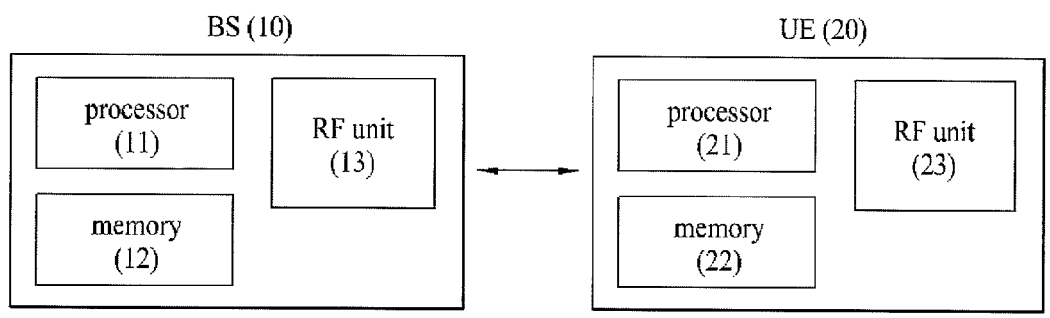
FIG. 9 is a diagram illustrating an example of an apparatus for supporting a method for reporting power headroom, which is disclosed in the present invention, in accordance with the embodiment of the present invention.

FIG. 9 is a diagram illustrating an example of an apparatus for supporting a method for reporting power headroom, which is disclosed in the present invention, in accordance with the embodiment of the present invention.

Referring to FIG. 9, a wireless communication system may include one or more base stations 10 and one ore more user equipments 20. In a downlink, a transmitter is operated as a part of the base station 10, and a receiver is operated as a part of the user equipment 20. In an uplink, the transmitter is operated as a part of the user equipment 20, and the receiver is operated as a part of the base station 10.

The base station 10 may include a processor 11, a memory 12, and a radio frequency (RF) unit 13. The processor 11 may be configured to implement procedures and/or methods suggested in the present invention. For example, the processor 11 of the base station may perform uplink resource scheduling considering PHR received from the user equipment and uplink resource scheduling and allocation functions for the user equipment. The memory 12 is connected with the processor 11 and stores various kinds of information related to the operation of the processor 11. The RF unit 13 is connected with the processor 11 and transmits and/or receives a radio signal.

The user equipment 20 may include a processor 21, a memory 22, and a radio frequency (RF) unit 23. The processor 21 may be configured to implement procedures and/or methods suggested in the present invention. For example, the processor of the user equipment may decode the PDCCH transmitted thereto by monitoring a search space using the RF unit and acquire information on uplink resources allocated thereto by detecting a DCI format included in the PDCCH. Also, the processor of the user equipment may calculate a power rate for the subframe and a power headroom value based on the transmission mode, and may report the calculated values to the base station. The memory 22 is connected with the processor 21 and stores various kinds of information related to the operation of the processor 21. The RF unit 23 is connected with the processor 21 and transmits and/or receives a radio signal.

The base station 10 and/or the user equipment 20 may have a single antenna or multiple antennas. When at least one of the base station and the user equipment has a plurality of antennas, the wireless communication system may be referred to as a multi-input multi-output (MIMO) system.

Figure 10:
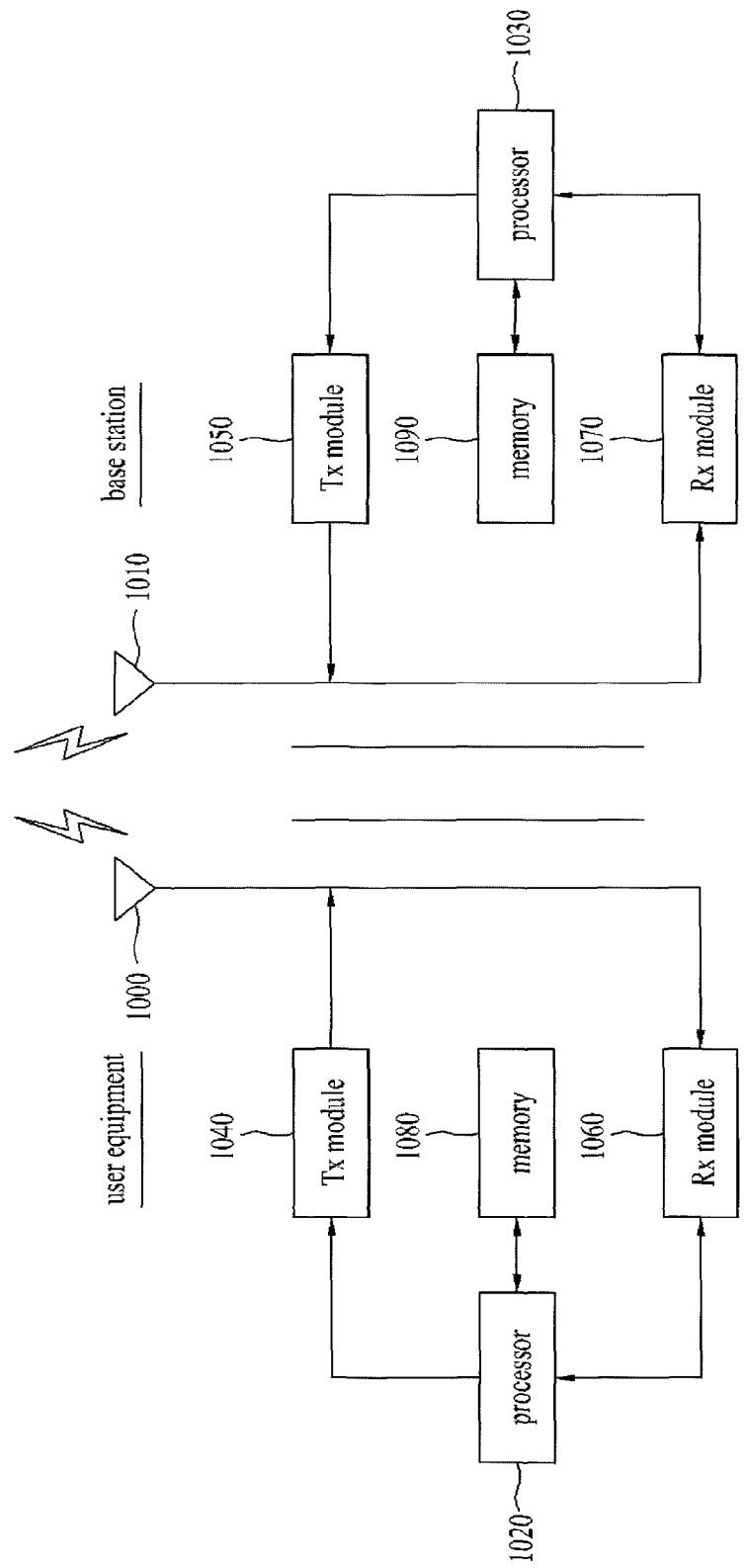
FIG. 10 is a diagram illustrating another example of an apparatus for supporting a method for reporting power headroom, which is disclosed in the present invention, in accordance with the embodiment of the present invention.

FIG. 10 is a diagram illustrating another example of an apparatus for supporting a method for reporting power headroom, which is disclosed in the present invention, in accordance with the embodiment of the present invention.

The user equipment UE may be operated as a transmitter in an uplink and may be operated as a receiver in a downlink. Also, the base station eNB may be operated as a receiver in an uplink and may be operated as a transmitter in a downlink.

In other words, each of the user equipment and the base station may include a transmission (Tx) module 1040, 1050 and a reception (Rx) module 1050, 1070 to control transmission and reception of data and/or message, and an antenna 1000, 1010 for transmitting and receiving information, data and/or message. Also, each of the user equipment and the base station may include a processor 1020, 1030 for performing the aforementioned embodiments of the present invention and a memory 1080, 1090 for temporarily or continuously storing a processing procedure of the processor.

In particular, the processor 1020, 1030 may perform second type ePH report and first ePH report in accordance with the transmission modes A and B of the user equipment in the carrier matching environment disclosed in the embodiments of the present invention. Also, the user equipment and the base station of FIG. 10 may further include a lower power RF (radio frequency)/IF (intermediate frequency) module.

The Tx module and the Rx module included in the user equipment and the base station may perform a packet modulation and demodulation function for data transmission, a quick packet channel coding function, an orthogonal frequency division multiple access (OFDMA) packet scheduling, time division duplex (TDD) packet scheduling and/or channel multiplexing function.

The apparatus described in FIG. 10 is the means for implementing the various power headroom report methods disclosed in the present invention. The embodiments of the present invention may be performed using the modules and functions of the user equipment and the base station.

In the meantime, in the present invention, examples of the user equipment may include a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, and a multi mode-multi band (MM-MB) terminal.

In this case, the smart phone is a terminal provided with advantages of a mobile communication terminal and a personal digital assistant (PDA). The smart phone may mean a terminal in which a schedule management function of the PDA and data communication functions of facsimile transmission/reception, internet access, etc. are integrated on a mobile communication terminal. Also, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

The embodiments according to the present invention may be implemented by various means, for example, hardware, firmware, software, or their combination.

If the embodiment according to the present invention is implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. For example, a software code may be stored in the memory unit 1080, 1090 and then may be driven by the processor 1020, 1030. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

The aforementioned embodiments of the present invention may be applied to various wireless access systems. Examples of the various wireless access systems include 3GPP LTE system, 3GPP LTE-A system, 3GPP2 and/or IEEE 802.16m system. The embodiments of the present invention may be applied to all the technical fields based on the various wireless access systems as well as the various wireless access systems.

What is claimed is:

1. A method for reporting power headroom value in a wireless access system that supports a carrier aggregation, the method performed by a user equipment (UE) and comprising:
receiving a uplink transmission grant allocating uplink resources on a predetermined subframe in an anchor uplink component carrier (UL CC);
obtaining power headroom value for the anchor UL CC, if the UE is configured with a simultaneous physical uplink control channel (PUCCH) and physical uplink shared channel (PUSCH) transmission; and
reporting the power headroom value to a base station,
wherein the power headroom value is calculated by using:

$$PH_{SUM}(i)=P_{CMAXc}-10\log_{10}(10^{PPUSCHc\_scheduled(i)/10}+10^{PPUCCH\_scheduled(i)/10}),$$

where $P_{CMAXc}$ represents the maximum transmission power of the UE, $P_{PUSCHc\_scheduled}(i)$ represents a transmission power for the PUSCH, and $P_{PUCCH\_scheduled}(i)$ represents a transmission power for the PUCCH, and
wherein 'i' is an index of the predetermined subframe and 'c' is an index of the anchor UL CC.

2. The method according to claim 1, further comprising:
transmitting the PUCCH on the predetermined subframe in the anchor UL CC.

3. The method according to claim 1, wherein the uplink transmission grant is received via a physical downlink control channel (PDCCH).

4. The method according to claim 1, wherein the anchor UL CC is a primary cell.

5. A user equipment (UE) for reporting power headroom value in a wireless access system that supports a carrier aggregation, the UE comprising:
a transmitter;
a receiver; and
a processor configured to:
report the power headroom value by controlling the transmitter and the receiver,
receive, by controlling the receiver, a uplink transmission grant allocating uplink resources on a predetermined subframe in an anchor uplink component carrier (UL CC),
obtain power headroom value for the anchor UL CC, if the UE is configured with a simultaneous physical uplink control channel (PUCCH) and physical uplink shared channel (PUSCH) transmission, and
report, by controlling the transmitter, the power headroom value to a base station,
wherein the power headroom value is calculated by using:

$$PH_{SUM}(i)=P_{CMAXc}-10\log_{10}(10^{PPUSCHc\_scheduled(i)/10}+10^{PPUCCH\_scheduled(i)/10}),$$

where $P_{CMAXc}$ represents the maximum transmission power of the UE, $P_{PUSCHc\_scheduled}(i)$ represents a transmission power for the PUSCH, and $P_{PUCCH\_scheduled}(i)$ represents a transmission power for the PUCCH, and
wherein 'i' is an index of the predetermined subframe and 'c' is an index of the anchor UL CC.

6. The UE according to claim 5, wherein the processor is further configured to:
transmit, by controlling the transmitter, the PUCCH on the predetermined subframe in the anchor UL CC.

7. The UE according to claim 5, wherein the uplink transmission grant is received via a physical downlink control channel (PDCCH).

8. The UE according to claim 5, wherein the anchor UL CC is a primary cell.

* * * * *